(12) United States Patent
Santos

(10) Patent No.: US 11,286,653 B2
(45) Date of Patent: Mar. 29, 2022

(54) FOG DISPOSAL ARTICLE

(71) Applicant: Shawn Alan Santos, Kailua, HI (US)

(72) Inventor: Shawn Alan Santos, Kailua, HI (US)

( * ) Notice: Subject to any disclaimer, the term of this patent is extended or adjusted under 35 U.S.C. 154(b) by 0 days.

(21) Appl. No.: 17/123,724

(22) Filed: Dec. 16, 2020

(65) Prior Publication Data

US 2021/0254320 A1 Aug. 19, 2021

Related U.S. Application Data

(60) Division of application No. 16/016,264, filed on Jun. 22, 2018, now Pat. No. 10,870,974, which is a continuation-in-part of application No. 15/860,212, filed on Jan. 2, 2018, now Pat. No. 10,246,862, which is a continuation of application No. 14/499,288, filed on Sep. 29, 2014, now Pat. No. 9,856,636.

(60) Provisional application No. 62/021,033, filed on Jul. 4, 2014.

(51) Int. Cl.

| E03C 1/26 | (2006.01) |
| C02F 1/28 | (2006.01) |
| E03C 1/264 | (2006.01) |
| C02F 103/32 | (2006.01) |
| C02F 101/32 | (2006.01) |
| C02F 1/40 | (2006.01) |

(52) U.S. Cl.
CPC .............. *E03C 1/26* (2013.01); *C02F 1/285* (2013.01); *E03C 1/264* (2013.01); *C02F 1/40* (2013.01); *C02F 2101/32* (2013.01); *C02F 2103/32* (2013.01); *C02F 2307/08* (2013.01)

(58) Field of Classification Search
CPC .. E03C 1/26; E03C 1/262; E03C 1/264; A47J 47/20; C02F 1/40; C02F 1/285; C02F 2307/08; C02F 2101/32; C02F 2103/32
USPC ........................................... 4/289–292
See application file for complete search history.

(56) References Cited

U.S. PATENT DOCUMENTS

| 1,313,153 | A | * | 8/1919 | Zboyan | .................... | E03C 1/264 |
| | | | | | | 4/289 |
| 1,450,629 | A | * | 4/1923 | Grigg | ...................... | E03C 1/264 |
| | | | | | | 4/286 |
| 1,756,290 | A | * | 4/1930 | Hibner | .................... | E03C 1/264 |
| | | | | | | 4/289 |
| 3,525,105 | A | * | 8/1970 | Richards | ................. | E03C 1/262 |
| | | | | | | 4/287 |
| 7,137,419 | B1 | * | 11/2006 | Reeves | ................ | B01D 29/085 |
| | | | | | | 141/340 |

(Continued)

*Primary Examiner* — J C Jacyna
(74) *Attorney, Agent, or Firm* — Thorpe North & Western LLP

(57) ABSTRACT

An article, a container, and a method for disposing of fat, oil, and/or grease (FOG). The article may include a top portion including a top opening and a perimeter rim, and a body portion connected to and below the top portion having; a continuous FOG-impermeable membrane and upper and lower body portions. The body portion may include a body middle surface dividing upper and lower body portions and may be placed on at least a portion of a surface. The lower body portion may be sized to fit within a drain. The container may include an integrally formed continuous outer shell including a partially hollow interior, a top part having a top opening, and liquid impermeable bottom and upper parts, and a middle part dividing the top and bottom parts and including at least one middle edge for placement on a first surface.

6 Claims, 11 Drawing Sheets

(56) References Cited

U.S. PATENT DOCUMENTS

| | | | | |
|---|---|---|---|---|
| 7,707,929 B1 * | 5/2010 | Bourgeois | ............ | E05B 63/125 |
| | | | | 99/340 |
| 8,016,150 B1 * | 9/2011 | Bunch | ................. | A47J 37/1271 |
| | | | | 220/571 |
| 8,109,671 B1 * | 2/2012 | Baker | ................. | A47J 37/1271 |
| | | | | 383/35 |
| 9,976,295 B1 * | 5/2018 | Booker, Jr. | ............ | E03C 1/264 |

* cited by examiner

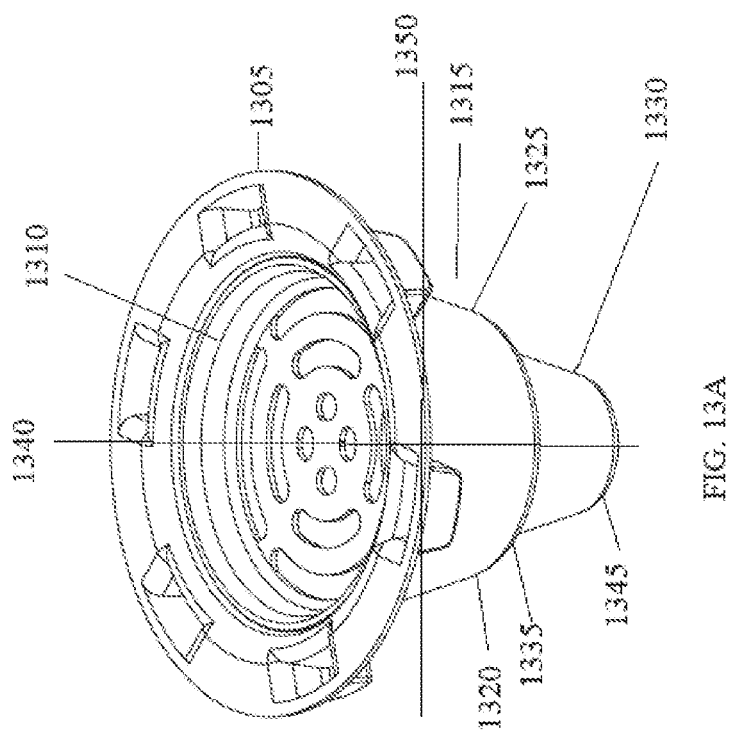
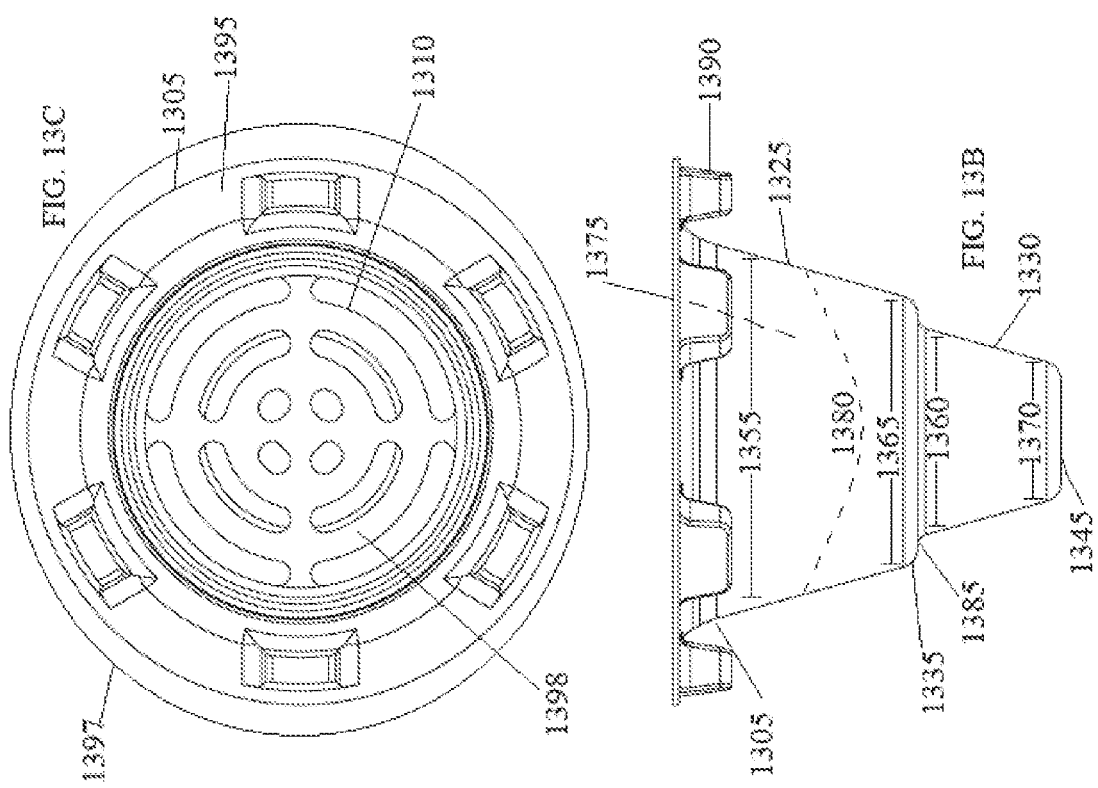

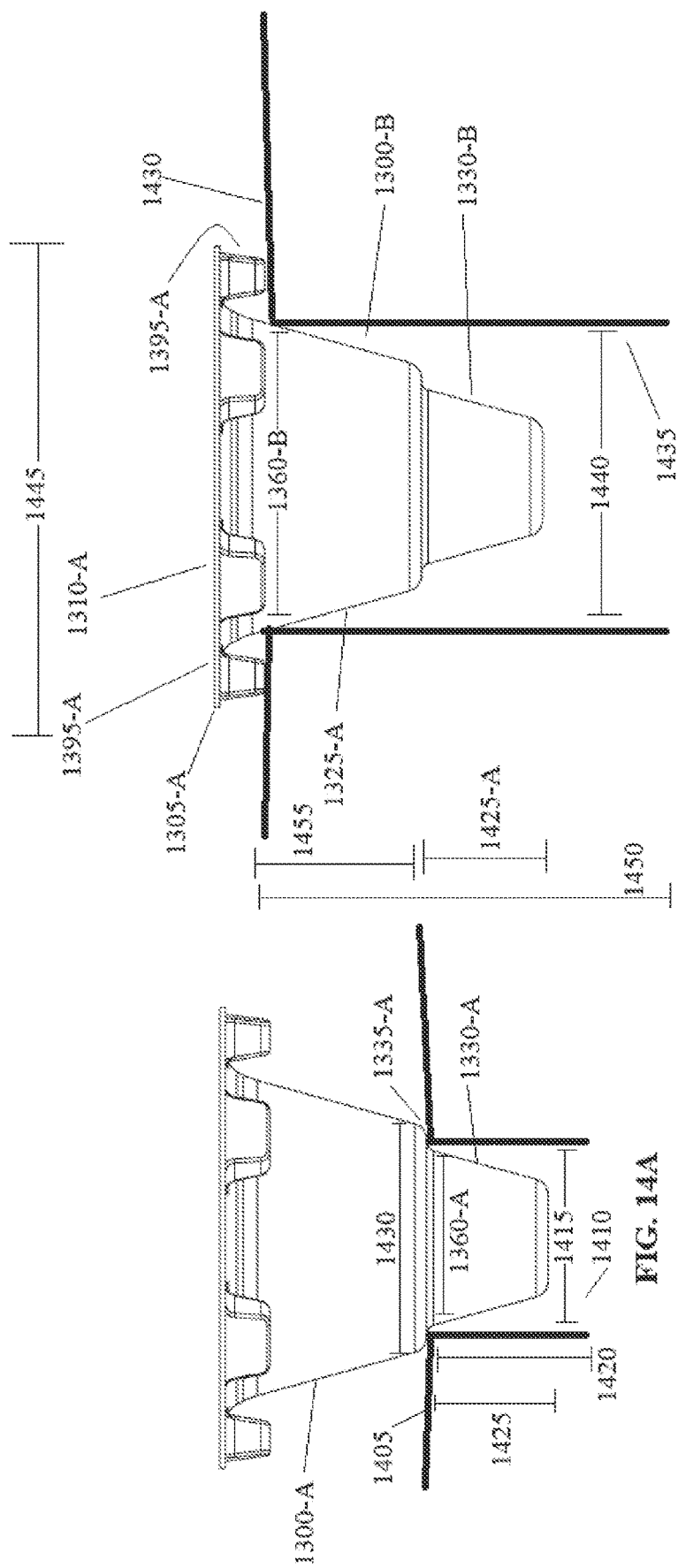

```
┌─────────────────────────────────────────┐
│ Positioning at least one edge of a      │
│ container on a first bottom surface of  │
│ a sink surrounding a first drain of the │──1605
│ sink so that a top opening of a top     │
│ portion of the container is facing      │
│ upward, and at least some of a body     │
│ portion of the container lies below the │
│ first bottom surface and within the     │
│ first drain.                            │
└─────────────────────────────────────────┘
                    │
┌─────────────────────────────────────────┐
│ Pouring the FOG through the top opening │
│ and into the body portion of the        │──1610
│ container, the container preventing the │
│ FOG from passing down the first drain.  │
└─────────────────────────────────────────┘
                    │
┌─────────────────────────────────────────┐
│ Wherein the body portion has a concave  │
│ shape, and positioning the at least one │
│ edge of the container on the first      │──1615
│ bottom surface so that at least some of │
│ the concaved shaped body portion lies   │
│ within the first drain.                 │
└─────────────────────────────────────────┘
                    │
┌─────────────────────────────────────────┐
│                                         │──1620
│ Wherein the at least one edge includes  │
│ a first perimeter rim, and resting the  │
│ first perimeter rim of the container on │
│ the first bottom surface.               │
└─────────────────────────────────────────┘
                    │
┌─────────────────────────────────────────┐
│                                         │──1625
│ Removing the container from the first   │
│ bottom surface, and subsequently        │
│ resting a second perimeter rim on a     │
│ second bottom surface of a sink         │
│ surrounding a second drain.             │
└─────────────────────────────────────────┘
                    │
┌─────────────────────────────────────────┐
│                                         │──1630
│ Absorbing at least some of the FOG      │
│ poured into the body portion using the  │
│ absorbent material.                     │
└─────────────────────────────────────────┘
```

FIG. 16                                    1600

FOG DISPOSAL ARTICLE

CROSS REFERENCE TO RELATED APPLICATIONS

The application claims benefit of priority to U.S. patent application Ser. No. 15/860,212, filed Jan. 2, 2018, which claimed benefit of priority to U.S. patent application Ser. No. 14/499,288, filed Sep. 29, 2014, which claimed benefit of priority to U.S. Provisional Patent Application No. 62/021,033, filed Jul. 4, 2014, and the entire disclosures of these applications are hereby incorporated by reference in this document.

FIELD OF INVENTION

This invention pertains to the field of articles for properly disposing of fat, oil, and/or grease ("FOG"). In particular, the invention relates to articles for preventing FOG from clogging pipes.

BACKGROUND OF INVENTION AND DESCRIPTION OF PRIOR ART

The kitchen is often a busy, hectic place where the stress of having to perform certain tasks within or at prescribed times is compounded by potentially dangerous activities, such as handling hot objects and liquids. Properly disposing of common cooking byproduct FOG in its hot liquid form can be time-consuming and even dangerous. For example, handling and disposing of hot liquid FOG often entails the risk of spillage from and/or "jumping" in small quantities out of a cooking instrument, which can result in burns, damage to surrounding kitchen objects, not to mention create an additional mess. On the other hand, waiting to dispose of FOG can be problematic because the FOG may cool, harden, and congeal to a cooking instrument (such as a frying pan), making cleaning and disposal more difficult. Due at least partly to the lack of attractive alternatives for properly disposing of FOG, FOG is unfortunately often poured in its liquid form down drains, where it flows into drainage pipes. Once in drainage pipes, the FOG cools, thickens, congeals, and sticks to the pipes, slowing water drainage, and eventually clogging and blocking flow altogether. This clogging and blogging causes substantial harm, such as destroying sceptic tanks, resulting in environmental damage (including soil and/or water contamination) and health hazards, emanating noxious smells, and attracting insects and pests. Conventional methods of removing FOG buildup in pipes are either unsatisfactory or costly. For example, the common practice of boiling and pouring hot water down the pipes only temporarily liquefies FOG, but does not prevent it from re-solidifying further down the line, where it may cause the same problems. Similarly ineffective is the method of pouring detergent down drains along with FOG. Thus, pipes clogged by FOG must often be replaced, which may require the services of a professional plumber.

Although several devices and methods have been created to try and solve the problem of proper FOG disposal, there is still a need for devices, articles, and/or methods that would reduce the amount of time and steps required to properly dispose of FOG in a safe, convenient, economical, and environmentally responsible manner, which would therefore provide a desirable alternative to pouring FOG down a drain.

SUMMARY OF THE INVENTION

Described herein is an article and a container and a method for disposing of FOG. According to at least one embodiment, an article for disposing of FOG is disclosed. In some examples, the article may include a top portion comprising a top opening and a perimeter rim, and a body portion connected to and located below the top portion. In some examples, the body portion may include a continuous FOG-impermeable membrane, an upper body portion having a first maximum width, and a lower body portion having a second maximum width and a concave shape. In addition, the body portion may include a body middle surface that divides the upper and lower body portions and may be configured for placement on at least a portion of a first bottom surface of a sink surrounding a first drain. The lower body portion may also be sized to fit within the first drain.

In some examples of the article, the interior of the body may also include FOG absorbent material. In some examples, the upper body portion may have a top maximum width contiguous to the top portion and a bottom maximum width contiguous to the body middle surface. In some examples, the top maximum width may be greater than the bottom maximum width.

In some examples of the article, the lower body portion may have an upper maximum width contiguous to the body middle surface and a lower maximum width defining a bottom of the body portion. The upper maximum width may be greater than the lower maximum width. In some examples of the article, the body middle surface may be flat.

In some examples of the article, the first drain may have a first drain maximum width that is greater than the second maximum width of the lower body portion. In some examples, the first drain may have a depth less than a height of the lower body portion. In some examples, the body middle surface may have a middle surface maximum width greater than the first drain maximum width.

In some examples, the top opening may be defined by the perimeter rim. In some examples, the perimeter rim may be configured for placement on at least a portion of a second bottom surface of a second sink surrounding a second drain having a second drain maximum width. In some examples, the upper body portion may be concave shaped and sized to fit within the second drain. In some examples, the perimeter rim may have a maximum width greater than the second drain maximum width. In some examples, the second drain maximum width may be greater than the first drain maximum width.

In some examples, the first maximum width of the upper body portion may be less than a second drain maximum width of a second drain sized to receive the upper body portion of the article. In some examples, the first maximum width may be greater than the second maximum width. In some examples, an exterior of the body portion may be defined by the continuous FOG-impermeable membrane.

According to at least one other embodiment, a container for disposing of FOG is disclosed. In some examples the container may include an integrally formed continuous outer shell including an at least partially hollow interior, a top part having a top opening, a liquid impermeable bottom part, and a liquid impermeable upper part connecting and contiguous to both the top part and the bottom part. In some examples, the container may also include a middle part dividing the top and bottom parts and including at least one middle edge for placement of the container on a first surface surrounding a first drain. The first drain may have a first maximum width, and the bottom part may have a shape conforming at least in part to a hollow inner part of the drain for placement at least partially inside the first drain. The outer shell may be configured to receive FOG through the top opening without the FOG exiting through the bottom part or the upper part.

In some examples, the bottom part may include a second maximum width less than the first maximum width of the first drain.

In some examples of the container, the at least one middle edge may include a flat surface for placement of the container on the first surface surrounding the first drain. In some examples, the flat surface may have a third maximum width greater than the first maximum width. In some examples, the top part may include at least one top edge for placement on a second surface surrounding a second drain having a fourth maximum width. In some examples, the at least one top edge may include a rim having a fifth maximum width greater than the fourth maximum width. In some examples, the fourth maximum width may be greater than the first maximum width, and the upper part may have a sixth maximum width less than the fourth maximum width and greater than the second maximum width. In some examples, the at least one middle edge may include at least two edges.

According to another embodiment, a method for disposing FOG is disclosed. The method may include positioning at least one edge of a container on a first bottom surface of a sink surrounding a first drain of the sink so that a top opening of a top portion of the container is facing upward, and at least some of a body portion of the container lies below the first bottom surface and within the first drain. In some examples, the body portion having a FOG-impermeable membrane. In some examples, the method may also include pouring the FOG through the top opening and into the body portion of the container, the container preventing the FOG from passing down the first drain.

In some examples of the method, the positioning may include resting at least two edges of the container on the first bottom surface. In some examples, the at least two edges may be located on different sides of the container. In some examples, the at least two edges may be located on opposite sides of the container.

In some examples, the at least one edge may include a first perimeter rim. And in some examples, the positioning may include resting the first perimeter rim of the container on the first bottom surface. In some examples, the first perimeter rim may be located at the top portion of the container. In some examples, the first perimeter rim may be located at the body portion. In some examples, the body portion may include an upper body portion and a lower body portion. In some examples, the first perimeter rim may divide the upper body portion and the lower body portion.

In some examples, the body portion may have a first maximum width, and the first drain may have a second maximum width greater than the first maximum width. And in some examples, the first perimeter rim may have a third maximum width greater than the second maximum width. In some examples, the container may include a second perimeter rim having a fourth (or second perimeter) maximum width greater than the third maximum width. In some examples, the method may further include resting the second perimeter rim on a second bottom surface of a sink surrounding a second drain. In some examples the second drain may have a fifth maximum width less than the fourth maximum width. In some examples the fifth maximum width may be greater than the second maximum width.

In some examples, the body portion may have a concave shape, and the positioning may include positioning the at least one edge of the container on the first bottom surface so that at least some of the concaved shaped body portion lies within the first drain. In some examples, the interior of the body portion may include absorbent material. In some examples, the method may further include absorbing at least some of the FOG poured into the body portion using the absorbent material.

In some examples, the FOG-impermeable membrane of the body portion may be liquid-impermeable. In some examples, the body portion may be connected to and located below the top portion. In some examples, the FOG-impermeable membrane may be continuous.

According to at least one other embodiment, an article for disposing of FOG is disclosed. The article may include a perimeter rim defining a top opening configured for placement on the bottom kitchen sink surface surrounding a drain of the hollow inward type, so that the body of the article, into which FOG may be poured, lies below both the perimeter rim and the top opening and may generally (but not necessarily always) lie at or below a lower elevation than the bottom sink surface, and fitting within the hollowed inward part of the drain, the body comprising a shape for stably resting within the drain cavity, and for maximizing the body volume for receiving the FOG poured therein. With the article body comprising a shape conforming to and configured to stably fit within the hollow inward cavity of the drain, FOG may be poured into the top opening of the article where it may be stored rather than enter the pipe(s) of the drain. As many kitchen sink drains have circular ring-shaped cross sections (with the inner portion of said ring forming the surface of the drain defining the hollow drain cavity), the article perimeter rim in many embodiments may accordingly be circular, having a circumference wider than the top of the drain contiguous to the kitchen sink bottom surface.

In some embodiments the article body may comprise a membrane perimeter being made of liquid-impervious hard liner material or other rigid exterior membrane that is impermeable to liquid FOG. Other embodiments may comprise an exterior membrane (i.e., membrane perimeter) that is substantially impermeable to liquid FOG. For example, in one embodiment the exterior membrane may by comprised of corrugated cardboard or recycled paper molded to the predetermined drain shape (molded for example utilizing a molded paper pulp process).

In some examples, article embodiments may also comprise an interior section of absorbent material, for converting FOG absorbed thereby from a liquid or semi-liquid state to a solid or semi-sold state. In one embodiment, the absorbent material may be at least partly enclosed by the exterior membrane to prevent the FOG from passing through the (potentially oversaturated) absorbent material and into the drain pipes. In some embodiments, the entire lower interior of the membrane body may be filled with absorbent material. Absorbent material may be configured to receive FOG through the top opening. Said absorbent material may also comprise material(s) and designs (as described in more detail below) or other absorbent means for maximizing the amount of FOG capable of being absorbed given the limited body volume (or container size for embodiments comprising containers). The FOG absorbent material in one embodiment may comprise polyurethane, and in one particular embodiment may also resemble a foam sponge comprised of cellulose material (such as wood pulp or other earth-friendly substance). In some embodiments, the entire article and/or the parts thereof may be disposable and/or biodegradable. For embodiments comprising absorbent means, with the FOG converted from a liquid state into an at least semi-solid state, the container may be placed in the trash with less risk that puncturing of the container will result in the FOG contents leaking into the remainder of the refuse.

The article may also comprise additional features for maximizing FOG absorption, such as in one embodiment a cover for placement in the top opening for distributing the FOG poured thereon in a predetermined manner over the absorbent material in order to increase FOG saturation of the absorbent material. Said cover in one embodiment may have a radially positioned array of slowed annular openings for distributing liquid over the absorbent material, the slots being of narrow width to keep the trapped and congealed FOG contained within the body for disposal. In addition to or instead of absorbent material or other absorbent means, some body embodiments may comprise art interior adsorbent surface (which in another embodiment might comprise a removable liner made of, for example, aluminum foil or heavy paper such as wax paper).

In one embodiment, the article may comprise a predetermined size and/or body volume (and amount of absorbent material) for holding an amount of FOG cooking byproduct tailored to a single instance of home cooking. For example, in one particular embodiment the body may have a volume for holding substantially four ounces of FOG and absorbent means configured to receive FOG in a maximum amount within the body volume. A size intended for optimally-efficient one-time use, without requiring additional instances of usage, to efficiently utilize and not waste container material, may allow a user to omit burdensome and time-consuming disposal steps, such as storage, sealing and unsealing a lid multiple times, and placing the container in a refrigerator or freezer.

In one embodiment, the exterior membrane of the body configured for placement in the hollowed inward portion of the drain is rigid (for among other benefits preventing hot liquid FOG poured thereon from compromising the figure of the membrane) and forms a container that stably rests in the drain while FOG is poured into the container through the top opening, with the container sides not stretching substantially above the level of the kitchen sink bottom surface, thus allowing a cooking instrument from which the FOG is poured to be held at a lower elevated and more advantageous position. In some container embodiments, the exterior membrane comprises a rigid outer shell for receiving, holding, and disposing of FOG, which may be separable from the portion of the article comprising the absorbent means. Thus, in some embodiments the FOG absorbent or adsorbent means may be disposed of without the rest of the article also having to be thrown away. In other container embodiments, the entire article may be designed for convenient disposal along with the FOG absorbent/adsorbent means.

The shape of the body configured for placement in a drain may also provide greater stability and less awkward handling while pouring FOG. Moreover, in one embodiment, the body may comprise an inside surface that may be continuously downward sloping, to facilitate continued downward flow of FOG due to gravity and filling of the lowest part of the interior of the container first, or to otherwise strategically pass liquid FOG to the section of absorbent material. With the article stably placed in a drain, the FOG may be poured therein with less risk of spilling, until at a maximum the FOG absorbent means has been fully saturated and/or until an adsorbent means has also reached its full capacity. In one embodiment, the article body may comprise a rigid, flat bottom surface for placement of the container on another flat surface, such as a countertop, with less worry of the FOG spilling. In one particular embodiment having downwardly sloping sides (and as described in more detail in the Description of the Drawings section), the flat bottom surface may have a width of substantially 2.6 inches. Some embodiments (and not necessarily limited to removable shell or container embodiments) may also comprise other features for more convenient and/or safer handling of the article, such as a perimeter rim comprising legs or knobs or other means for holding the rest of the perimeter rim elevated sufficiently above the bottom surface of the kitchen drain surface (yet still not substantially above the kitchen drain bottom surface) to facilitate grabbing with fingers and removing the article from the drain once the FOG has been poured therein.

Thus embodiments of articles and containers and methods may allow disposing of FOG in a more expeditious, economical, efficient, environmentally friendly, regulation-compliant, and safe manner. The above-described embodiments are considered that of some embodiments only. It is understood that the embodiments shown in the drawings below and described above are merely for illustrative purposes and not intended to limit scope. Therefore, alterations, modifications, and such further applications as would occur to those skilled in the relevant art(s) are also contemplated.

BRIEF DESCRIPTION OF THE DRAWINGS

FIG. 13A is an overhead perspective view of another article embodiment for disposing FOG, in accordance with various aspects of this disclosure;

FIG. 13B is a side view of the article embodiment of FIG. 13A, in accordance with various aspects of this disclosure;

FIG. 13C is a top view of the article embodiment of FIG. 13A, in accordance with various aspects of this disclosure;

FIG. 14A is a side view showing the article embodiment of FIG. 13A in an environment of use, in accordance with various aspects of this disclosure;

FIG. 14B is a side view showing the article embodiment of FIG. 13A in another environment of use, in accordance with various aspects of this disclosure;

FIG. 16 is a flowchart illustrating another example of a method for disposing FOG, in accordance with various aspects of this disclosure.

DETAILED DESCRIPTION OF THE PREFERRED EMBODIMENTS

Figure 1:
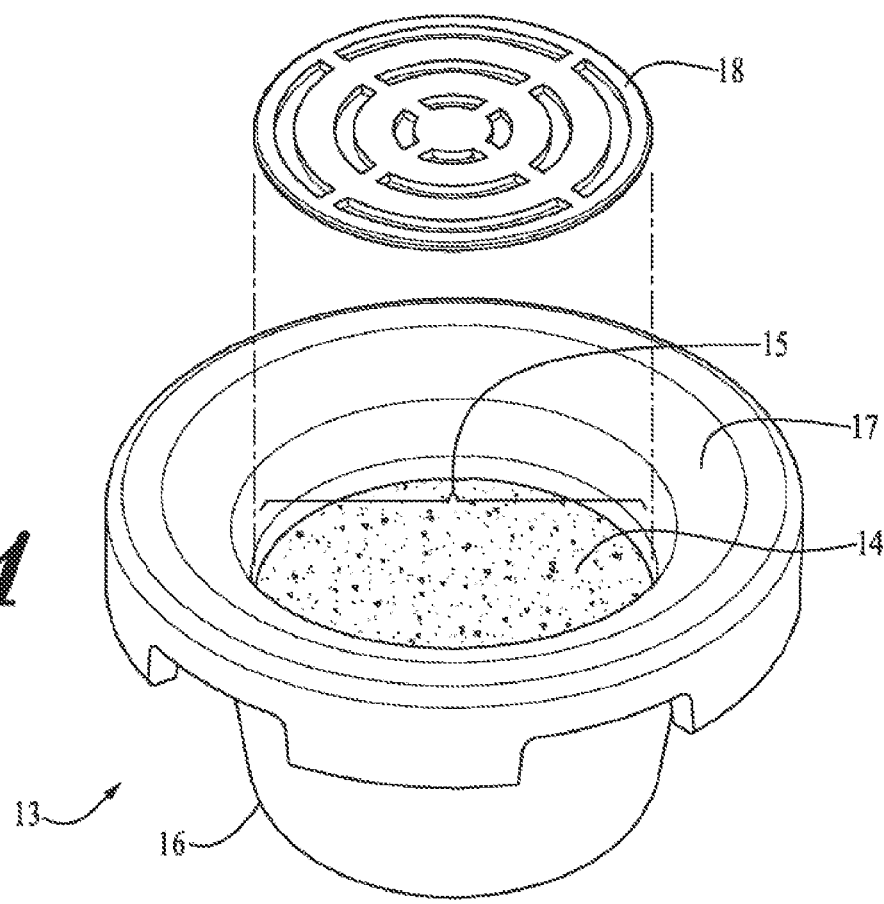
FIG. 1 is a top perspective view of a first article embodiment for disposing of FOG in accordance with various aspects of this disclosure.

For many people, prior art articles, methods, and devices for disposing of FOG simply do not provide a sufficiently attractive alternative to pouring FOG down drains. Pouring hot liquid FOG directly into the trash, for example, is of course not preferable because it can burn through the refuse, garbage bag, and damage the garage container or even start a fire. A noxious odor can also begin to emanate from congealed FOG stored in the trash. Placing FOG in bags or containers with nonrigid or thin membranes, which are then placed in the trash, is similarly undesirable since the containers/bags can be punctured and the FOG can be reheated at some point, causing the FOG to return to its liquid and potentially problematic form. In addition to the risk of puncturing, non-rigid and thin container membranes (such as those made of certain plastics and/or thin metal foil) may also either be melted or deformed by hot liquid FOG and/or bent out of shape by the weight of FOG poured thereon or by external objects. For example, after liquid FOG is poured into containers/bags with non-rigid membranes, such containers/bags are more likely to take the shape of the inside liquid contents, and therefore may be awkward to handle, increasing the likelihood of spilling. The risk of spilling is even greater when/if the bags are not sealed fairly soon after FOG is placed therein. Similarly, if such bag openings are not sealed completely, the lack of a substantially rigid membrane increases the likelihood of the FOG leaking and spilling through breaches in the seal.

On the other hand, containers/bags with thicker and more impervious membranes are generally more costly to produce. Since these costs are normally passed onto consumers, and prior art containers/bags holding congealed FOG must normally be disposed of along with the FOG, it may be impractical for cost-conscious consumers to regularly use and dispose of such more expensive containers/bags. In addition to higher costs, many such containers/bags with thicker less pervious membranes (and even those with thinner, more pervious membranes) are less biodegradable and therefore more harmful to the environment. For example, although some containers might be recyclable when not contaminated with FOG, the congealed and sticking FOG may foreclose such functionality, which may result in additional environmental harm (especially where the container is not biodegradable).

Environmental harm may also be increased unnecessarily (however slightly) by the many prior art containers/bags with sizes substantially larger than the volume of the liquid FOG placed therein. Specifically, when said overly large containers, filled just-partially with FOG, are disposed of in the trash, the unnecessary container material is wasted and also takes up more space in the trash. On the other hand, when such larger containers/bags are used to dispose of FOG in a manner that does not waste material—requiring reuse multiple times for separate instances of FOG-producing cooking activities in order to "fill up" the container volume—then more time-consuming steps are required for proper disposal. For example, many containers/bags appear to be designed to hold approximately one quart of FOG or more, yet the FOG byproduct from one non-commercial cooking session is often much less than a quart. It is not uncommon, for example, that one instance of home cooking generates an amount of FOG byproduct not substantially more than four ounces, and in a range of two to six and a half ounces. Regardless of the precise amount of FOG byproduct generated, the larger containers/bags must often be reused several times before disposal in order to avoid waste of container material, and thus require additional and time-consuming steps relating to such reuse. Such steps include, for example, in the interim between each addition of FOG by product from different instances of cooking, the proper storage of both the FOG and container, during which time bacteria and pests may be attracted and/or unpleasant odors emanated. To try and counter these and other negative effects, a FOG-holding container/bag is often either placed in a refrigerator or freezer, thus requiring additional space, attention, and time, or sealed, for example, with a removable lid, and then unsealed when more FOG is placed therein, which sealing and unsealing requires additional time. Suffice it to say that due to several different factors, the extra steps for using a container/bag multiple times to dispose of FOG without wasting (potentially expensive) container material may be undesirable (e.g., too time-consuming) and lead to a person disposing of FOG improperly, such as by pouring it down a drain. Although it would be desirable to have a disposable, environmentally-friendly article that allowed omission of some disposal-steps and that provided a practical, cost-conscious, non-wasteful solution for effectively and properly disposing of FOG, few if any disposable articles are specifically designed to dispose just of the more limited amount of FOG produced in one instance of cooking at home, efficient for such one-time use and without requiring reuse in order to not waste material.

It would further be desirable if such a novel article existed and also comprised other features for easy and safe use (e.g., pouring) without entailing wastefulness of material and/or substantially higher costs. For example, larger containers/bags are not only more expensive to produce than smaller containers/hags (other factors being equal), but in some instances can also be less wieldy in the kitchen, especially when one hand is occupied holding a cooking instrument containing FOG. Moreover, although sealing with a lid may assist in avoiding spilling when a container is placed in the trash, containers with lids are additionally more expensive to manufacture, with the expense normally increasing with the size of the lid. On the other hand, smaller lids require smaller openings, which provide smaller targets for pouring FOG into the containers.

Several other factors in addition to unwieldiness and opening size can also make pouring FOG into prior art containers and bags a somewhat challenging task. For example, hot "liquid" FOG may include lumps, ask or even small food particles, which inconsistencies can result in irregularities in flow when pouring. Furthermore, FOG may be created in various cooking instruments that are not conducive to pouring in a precise manner, such as cooking pans with gradually curved rims and flat edges (i.e., without spouts or other features for focusing or directing flow of a liquid). The potentially high temperatures of such cooking instruments, moreover, especially immediately after cooking when the FOG is still in hot and liquid form, combined with potentially dirty, oily and/or slippery surfaces due for example to heated FOG particles that may have exited the cooking instrument during cooking, can lead to less sure gripping of the cooking instrument. Similarly, the handle(s) of such instruments may not have been designed to provide optimal leverage, vantage point, or control for pouring. For example, in the case of cooking instruments that are pans, the FOG may normally be poured by holding the pan away from the body with the arm outstretched, and slowly tilting a side of the pan towards the container and attempting to monitor the flow of liquid with the naked eye.

This challenge of controlling pouring the FOG is often exacerbated (whether or not consciously recognized by the person pouring) by an often-raised position of the container/bag due both to placement on elevated kitchen countertops and the large sides of the such prior art container/bag that create an elevated container/bag top opening that may even be higher above the kitchen countertop level. This elevated position of the "point of entry" for the pouring of the FOG may require that the FOG-pouring cooking instrument (e.g., the pan) be held by the arm(s) and hand(s) in an even more lofty and harder to control position. However, the higher the hot liquid FOG is held, the potentially more dangerous such FOG can be if it leaves the confines of the cooking instrument, either by "jumping" from the cooking instrument due to high temperature, or by spilling. Moreover, to achieve greater stability when holding the cooking instrument in a high pouring position, two hands may often be used to grip the cooking instrument or handle(s) thereof—which may leave no hand free to adjust the position of the container/bag according to the point of pouring FOG flow or to stabilize the container/bag, which unbraced-container/bag might then be inadvertently bumped by the cooking instrument (possibly causing spilling). Thus, it would be desirable if a container with a substantially rigid membrane existed that allowed more stable pouring of FOG at a lower, more controllable and safe position.

Even when liquid FOG is successfully poured into a container/bag and then placed in the trash, as mentioned above, at some point in the disposal process (e.g., from the garbage to the refuse landfill) the container/bag's membrane may become compromised and the FOG may become reheated and return to a harmful liquid form. Possibly aimed to prevent such situations, some municipalities have prohibitions against placing FOG in the trash in free-flowing liquid form, or in a form that can become liquid upon application of heat. Some municipalities may allow, however, disposal of FOG if bound in a stable solid form. This may be accomplished, for example, by the FOG being absorbed by a solid or semi-solid medium. Although different types of absorbent material may provide varying advantages such as weight, rate of absorption, and level of saturation, few methods and devices comprise designs or shapes for more effectively utilizing absorbent material and/or maximizing the space inside a container housing absorbent material. However, effectively utilizing absorbent material and maximizing such container may be beneficial for articles that are intended to consolidate space for purposes of efficiency, size, and convenience. Thus, either to comply with municipal code or simply to avoid the potential disadvantages associated with FOG in liquid form, it would be beneficial if in addition to there being a practical, convenient, and efficient, one-time use, disposable, environmentally-friendly container for disposing of FOG, said container also comprised absorbent material for converting FOG from a liquid form to a semi-stable solid form (notwithstanding application of heat). It would be further desirable if such a container comprised a design of absorbent material for maximizing the amount of FOG saturation in a limited amount of absorbent material volume, and were comprised of substantially rigid membranes and designs lending to stability while pouring FOG therein.

Described herein is such an article for disposing of FOG that overcomes one or more of the aforementioned challenges, such as those associated with substantially non-rigid membranes (which may lead to awkward handling, spillage, and bending/disfiguration of the membrane at the point of FOG contact), having to pour FOG from an elevated position into an elevated point of entry (i.e., opening) of a container/bag, wasting container material, requiring time-consuming steps, being prohibitively expensive (when disposing a container after each session of FOG-generating cooking), not maximizing FOG saturation of absorbent material, and not being environmentally friendly. Said article for overcoming one or more of such challenges may provide consumers among other benefits an attractive alternative and practical solution to pouring FOG into a drain (where it can cause environmental harm).

The relative convenience of securely placing the article in the hollowed portion of the drain of the kitchen sink may encourage proper disposal instead of pouring FOG down a drain and serve as an effective reminder to a user to not pour the FOG down the drain. In addition, the stabilized position for holding the container within the hollowed inward drain while FOG is poured therein, without requiring use of other supporting devices (such as a funnel) or stabilization by a person's hand(s), may allow a person to use both hands to carefully pour the FOG into the article.

The placement of the article in the substantially lower-elevated position of the drain, furthermore, such as that found along the floor of a kitchen sink, may allow a person to more easily and in a more controlled manner hold a pan or other cooking instrument at a lower point over the container, thereby avoiding the expenditure of greater energy and allowing more control. Pouring at a level below the countertop level and/or substantially at the surface of a kitchen sink may also be advantageous in the event that hot liquid FOG "jumps" from a container or pan. Being held at a lower elevation, furthermore, takes advantage of the force of gravity and makes such erratic FOG-particle jumping, if it does occur, less likely to result in damage or injury by for example burning a person's skin or causing damage to surrounding objects. For example, with the article (and the top opening—i.e., the point of entry of the poured FOG) placed at such a lower elevation in a kitchen drain or garbage disposal, the sides of a kitchen sink may also act more effectively as protective walls preventing the FOG from causing injury or damage or mess outside the sink area. Moreover, the vantage point of looking down into the article in the drain, and of standing in closer proximity to the container may also assist in careful pouring without spilling. In addition, the size of the top opening of the article may be substantially equal to the width (or diameter) of the drain opening, thereby providing a sufficiently large "target" for pouring the FOG into (when compared to the more narrow openings of some conventional containers). Moreover, due to the fact that the top opening of some article embodiments may not be substantially wider than the drain opening diameter or substantially elevated above the kitchen sink floor surrounding the drain, the article may be placed in the drain without substantially encumbering the area above or around the drain (and especially without encumbering said area with potentially unused container volume), which area might instead be more easily used for careful manipulation of a cooking instrument holding and/or pouring FOG.

Although sealing of the container (in container embodiments) may not be necessary once the FOG has been absorbed and converted into at least partially solid form, in some embodiments (including those without absorbent means) the top opening may close after FOG is poured therein, and wall revealed, and in other embodiments may be reopened and resealed according to user preference.

In some embodiments the article exterior membrane may also compose supporting bars to provide additional structural support, which may further assist in retaining intended shape without requiring a thicker exterior membrane. It is further anticipated that the article may comprise material, in one embodiment, that is not only impervious to hot liquid FOG, but may also comprise on the outside heat absorbing material, allowing grabbing and holding without risk of burning a person's hand.

Turning to the drawings, FIG. 1 illustrates a first article embodiment 13 for disposing of FOG, in accordance with various aspects of this disclosure. The article 13 may comprise absorbent material 14 contained by an outer body perimeter (i.e., exterior membrane forming a body shape) 16, and a top opening 15 above the absorbent material 14 for receiving FOG there-through, the top opening 15 defined by a perimeter rim 17 having a width wider than the body perimeter 16.

Figure 2:
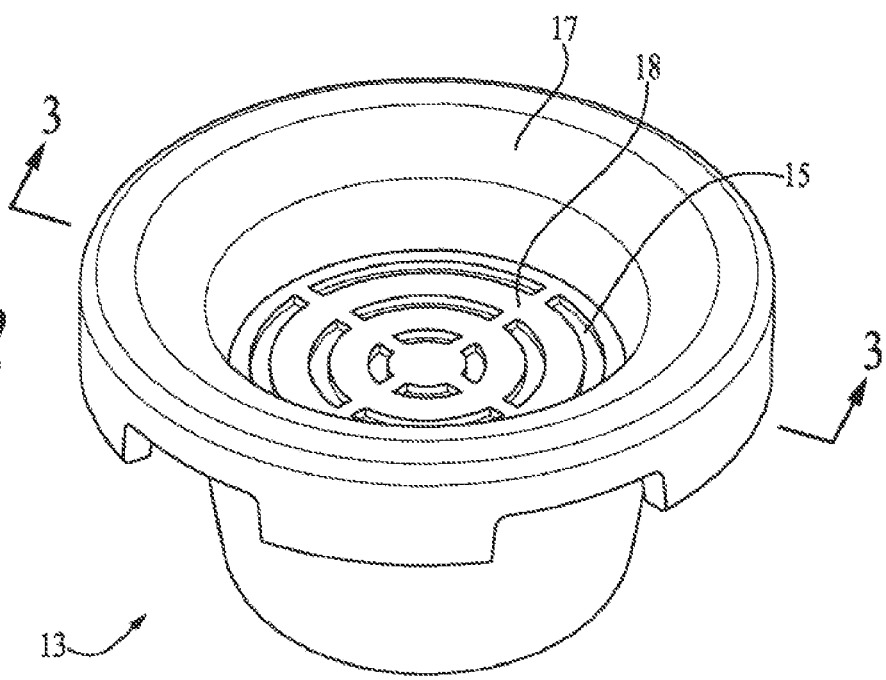
FIG. 2 is a top perspective view of the article of FIG. 1 with the FOG-distributing cover placed over the top opening, in accordance with various aspects of this disclosure.

FIG. 2 is a top perspective view of the article of FIG. 1, in accordance with various aspects of this disclosure. The article 13 may also comprise a cover 18 for placement over both the top opening 15 and the absorbent material 14 thereunder. The cover 18, in the embodiment 13 shown, when placed over the top opening 15 defined by the perimeter rim 17, may comprise a design for distributing FOG 19 more evenly over the absorbent material 14.

Figure 3:
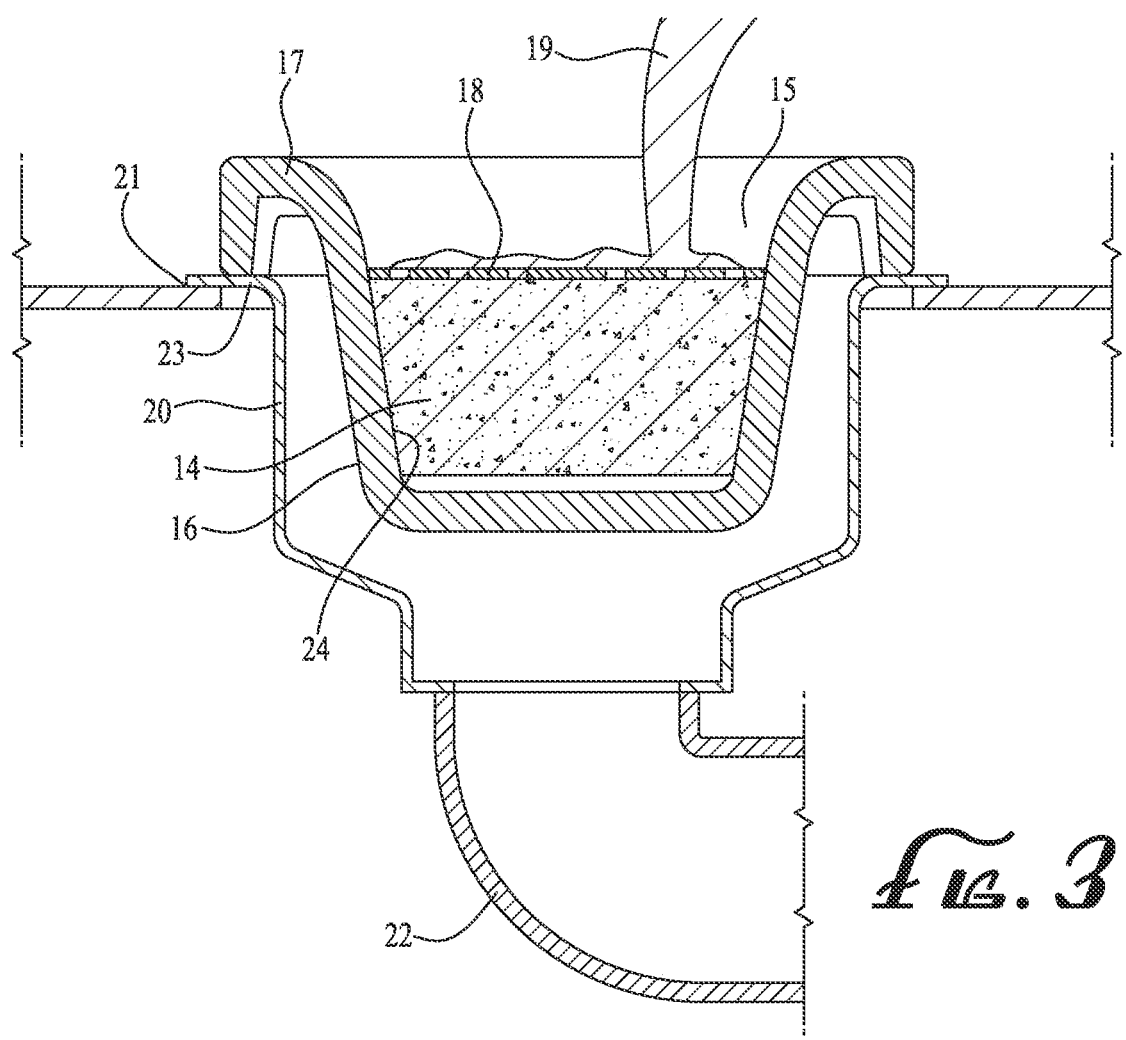
FIG. 3 is a cutaway cross sectional view of the article of FIG. 2 placed in a drain of a kitchen sink, in accordance with various aspects of this disclosure.

FIG. 3 is a cutaway cross sectional view of the article of FIG. 2 placed in a drain of a kitchen sink, in accordance with various aspects of this disclosure. The perimeter rim 17 may comprise dimensions and/or have a shape adapted for placement on the bottom kitchen sink surface 21 surrounding a drain 22 of the hollow inward type, so that the article body 16 (or some portion thereof), more narrow than and below the rim 17, may fit within the drain cavity 20 and stably rest therein. The body 16, moreover, may comprise a shape conforming to, the hollow inward cavity of the drain 20 and configured for maximizing the amount of absorbent material 14 and available volume for receiving the FOG 19 therein.

The drain 20 shown, like drains often found along a bottom kitchen sink surface 21, comprises circular ring-shaped cross sections. Accordingly, the perimeter rim 17 of the article embodiment 13 shown may also be circular, having a circumference greater than the circumference of the top of the drain 23 (contiguous to the kitchen sink bottom surface 21) for placement thereon, and the body 16 also may also have circular cross sections of sizes for securely placing the article 13 within the concave drain 20. The top opening 15 defined by the perimeter rim 17 may also have a circumference and/or width substantially approximating the circumference and/or width of the top of the drain 23, thereby providing a larger "target" for pouring the FOG there-through. For example, the combined width of the top opening 15 and the perimeter rim 17 may be in the embodiment shown substantially 4.4 inches. The height of the perimeter rim 17 in the embodiment shown may substantially be 0.75 inches, or other height so that the top opening 15 is not substantially above, or rather substantially even with the level of the bottom sink surface 21. The height from the top of the perimeter rim 17 to the bottom of the article 13 may in the embodiment shown be substantially 2.38 inches. In the embodiment 13 shown, the body 16 may also comprise an inside surface 24 bordering the absorbent material 14 that is continuously downward sloping, and may in the embodiment shown have a pitch of substantially 18 degrees, to facilitate continued downward flow of FOG 19 so that the absorbent material 14 is more likely to become saturated first from the bottom up. In this manner, pouring FOG 19 into the top opening 15 prevents and provides an attractive alternative from FOG 19 being poured down the drain 20 and entering a pipe 22.

Figure 4:
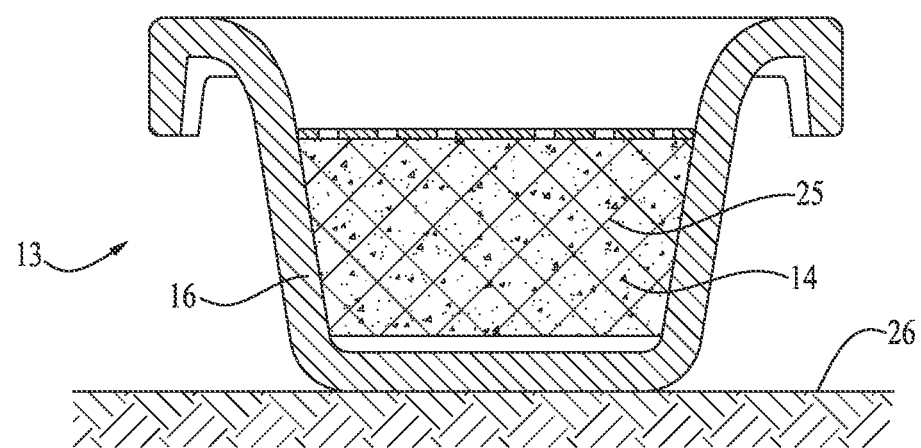
FIG. 4 is a cutaway cross sectional view of the article of FIG. 3, in accordance with various aspects of this disclosure.

FIG. 4 is a cutaway cross sectional view of the article of FIG. 3, in accordance with various aspects of this disclosure. The absorbent material 14 in the particular embodiment shown 13 may have a sponge-like texture (may comprise polyurethane), and may convert the liquid FOG 19 absorbed thereby to a solid or semi-sold, more stable state 25. So-converted, the FOG is ready for proper disposal and may be removed from the drain of FIG. 3, and placed on another surface 26 (or in the garbage) without fear that the solid-FOG 25 contents may spill from the article 13. Moreover, the perimeter body 16 of the embodiment shown 13 may be comprised of environmentally-friendly rigid/semi-rigid material, such as hard paper liner allowing the article 13 to retain its form even when the liquid FOG 19 therein has not yet cooled or congealed or converted into its solid/semi-solid FOG state 25.

Figure 5:
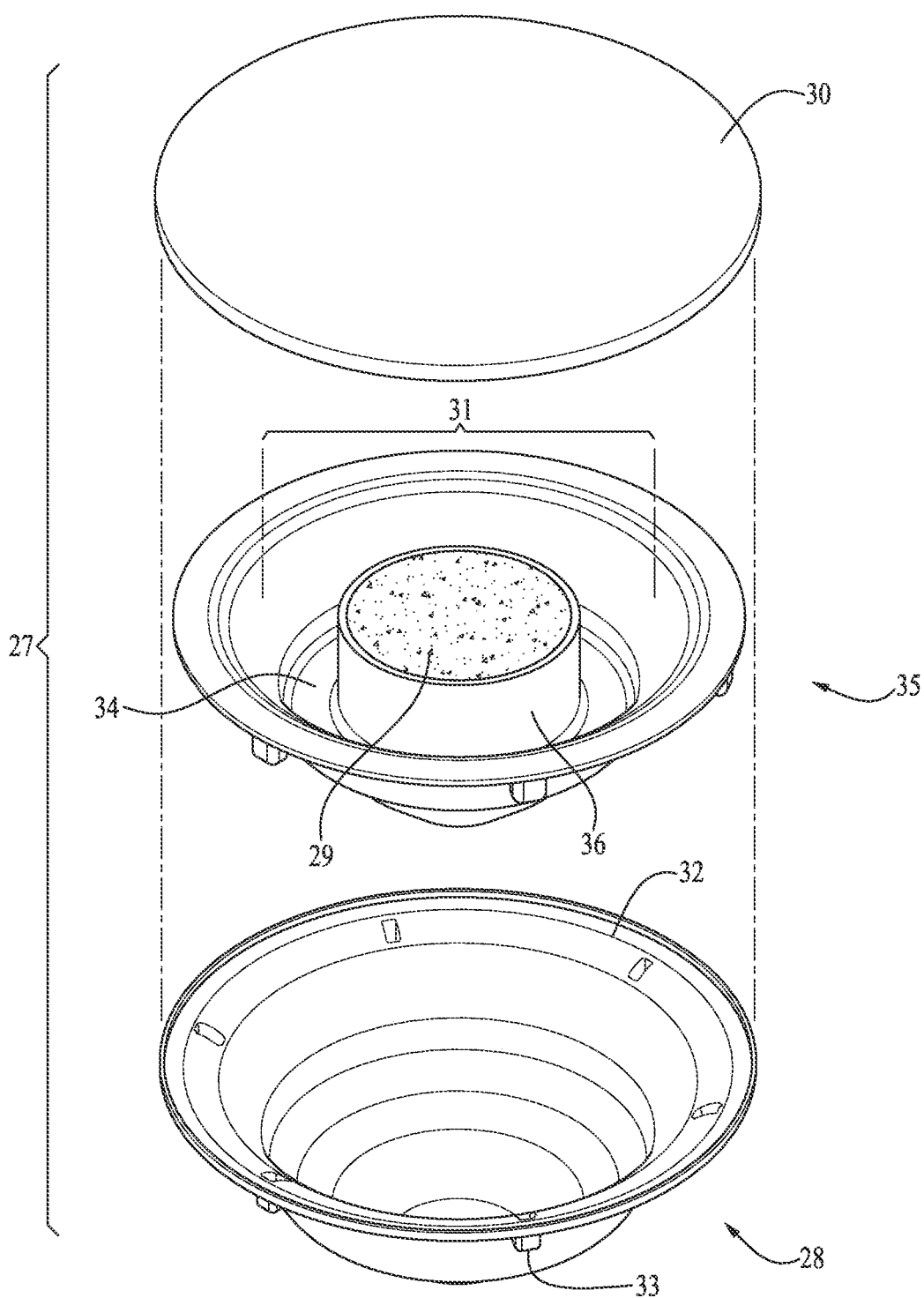
FIG. 5 is a top perspective view of a separated second article embodiment for disposing of FOG, in accordance with various aspects of this disclosure.

FIG. 5 is a top perspective view of a separated second article embodiment for disposing of FOG, in accordance with various aspects of this disclosure. This second article embodiment 27 for properly disposing of FOG may comprise a body perimeter that is a shell container 28 also having a shape for at least partially fitting in a drain 20, similar to that previously-described for the first embodiment 13 above (in FIG. 3), having circular cross sections, and also comprising a perimeter rim 32. The second article embodiment 27 may also comprise a top opening 31, and absorbent material 29 configured for fitting within the shell container 28, and may also comprise a filter 30 for placement over the top opening 31 and absorbent material 29. However, the top opening 31 need not be defined by the perimeter rim 32, but rather may be comprised by a liner piece 35 configured for placement within the shell container 28, which liner piece 35 may also comprise the absorbent material 29. The size of the absorbent material 29 in the second embodiment 27 may also comprise a predetermined size and/or body volume and/or material type for absorbing an amount of FOG cooking byproduct tailored to one instance of home cooking. The perimeter rim 32 may also comprise legs 33 for holding the rest of the perimeter rim 32 elevated to facilitate grabbing as described in more detail below. The second embodiment 27 also comprises a trough 34 overflow area for catching FOG once the absorbent material 29 is saturated. The trough 34 area may be formed by a ride exterior membrane 36 enclosing the sides of the absorbent material 29, joined to/intersecting with the downward-middle sloping wall of the liner 35.

Figure 6:
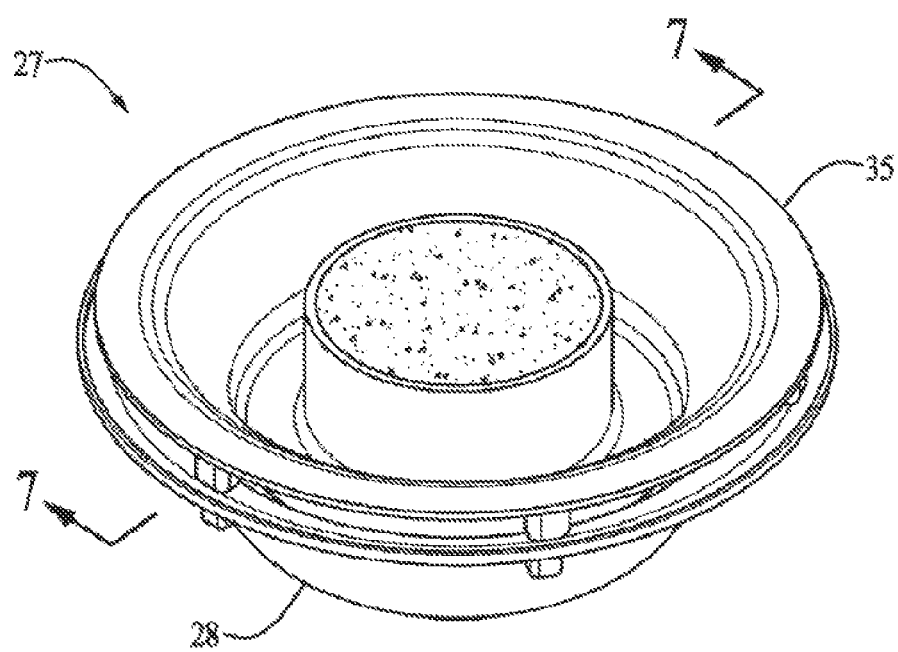
FIG. 6 is a top perspective view of the unseparated article of FIG. 5, in accordance with various aspects of this disclosure.
Figure 7:
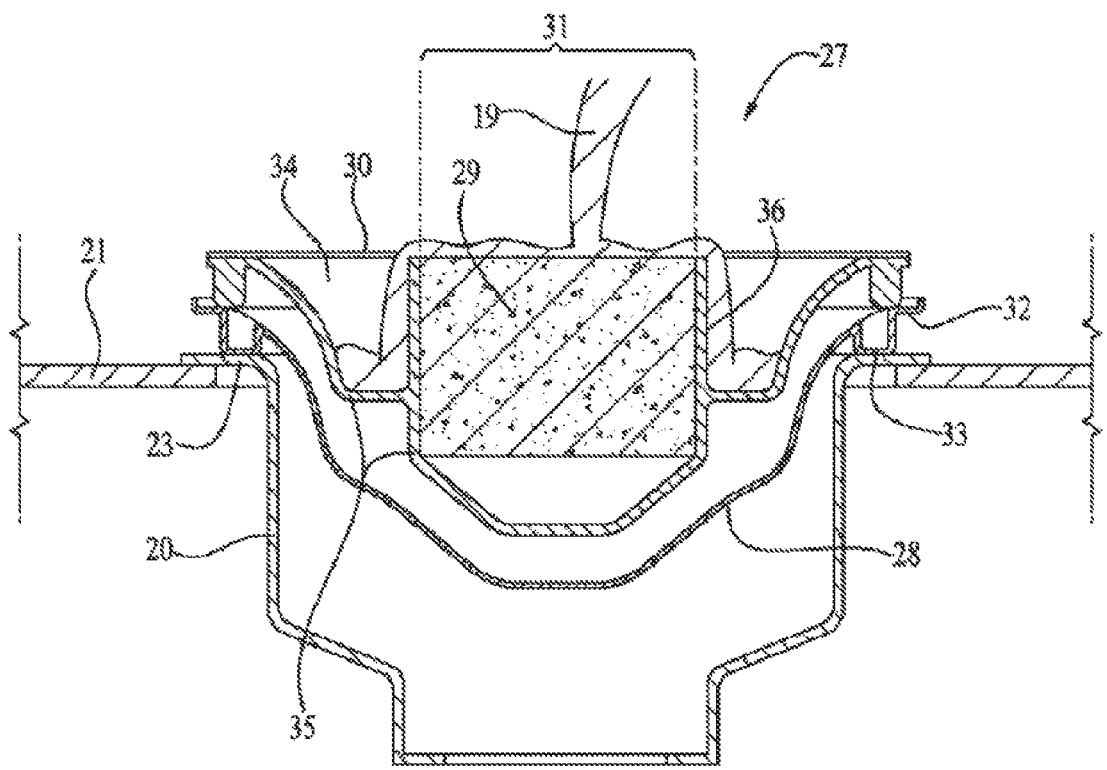
FIG. 7 is a cutaway cross sectional view of the article of FIG. 6, placed in a kitchen sink drain, in accordance with various aspects of this disclosure.

FIG. 6 is a top perspective view of the unseparated article of FIG. 5, in accordance with various aspects of this disclosure. And FIG. 7 is a cutaway cross sectional view of the article of FIG. 6, placed in a kitchen sink drain, in accordance with various aspects of this disclosure. As shown in FIG. 6, the liner piece 35 may be placed inside the shell/container 28 (and the liner piece 35 may also be removable from the shell/container 28), and as shown in FIG. 7 the filter 30 may be placed over the top opening 31 and the absorbent material 29, and the article 27 may be placed in the drain 20 along a bottom kitchen sink surface 21, with the legs 33 of the perimeter rim 32 resting along the top of the drain 23 so that the shell/container 28 stably rests inside the drain 20. The trough 34 formed by the absorbent side exterior liner/membrane 36 and the downward-middle sloping wall of the liner 35 may capture any excess FOG 19 that was poured into the filter 30 and top opening 31 but that was not absorbed by the absorbent material 29. After the absorbent material 29 has absorbed the liquid FOG 19, and any excess FOG 19 has been properly dealt with, disposal may occur, either by disposing of just the liner piece 35 (comprising the absorbent material 29) after it has been separated from the shell/container 28, or the entire article 27. Thus, the shell/container 28 in one embodiment 27 may assist in providing a more secure fit within the drain 20, and/or providing an extra layer of cautiousness to assure that FOG 19 does not escape down the drain 20.

Figure 8:
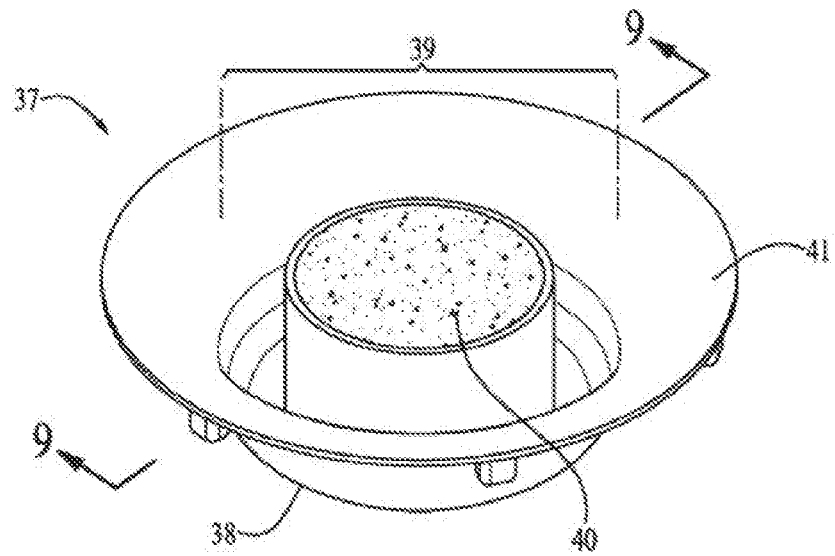
FIG. 8 is a top perspective of a third article embodiment for disposing of FOG, in accordance with various aspects of this disclosure.

FIG. 8 is a top perspective of a third article embodiment for disposing of FOG, in accordance with various aspects of this disclosure. Some embodiments, like the third article embodiment 37 shown in FIG. 8, may not necessarily comprise the outer shell container 28, but rather may simply comprise a rigid outer membrane 38 for placement within the drain 20. The embodiment 37 also need not comprise a filter 30 (like the second article embodiment 27 shown in FIGS. 5-7) but rather may comprise an exposed top opening 39 defined by a perimeter rim 41, which rim 41 may also be configured for placement over the top of the drain 23 contiguous with the bottom sink surface 21. The outer membrane 38 may also be comprised of substantially rigid material so that it does not lose some of its form when FOG 19 is placed therein and over the absorbent material 40.

Figure 9:
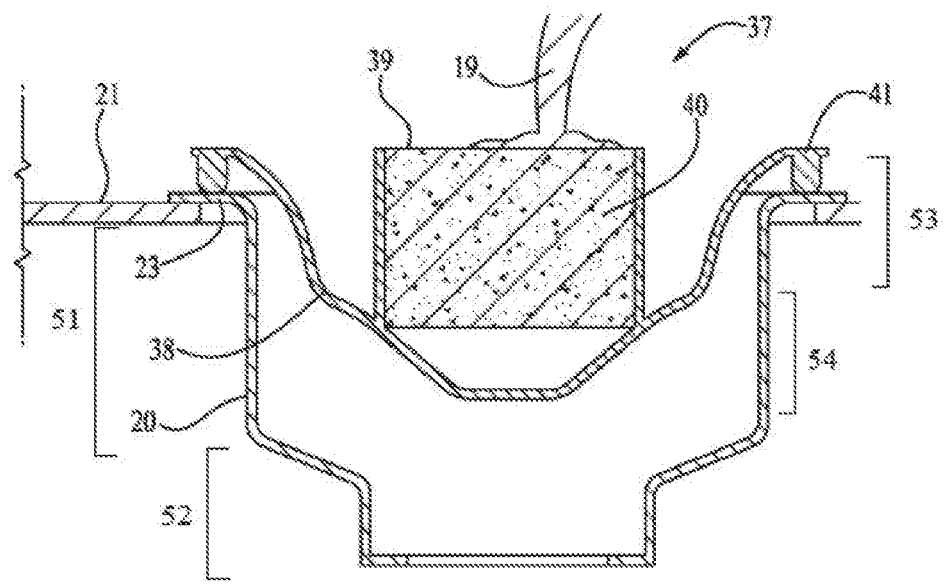
FIG. 9 is a cutaway cross sectional view of the article of FIG. 8, placed in a kitchen sink drain, in accordance with various aspects of this disclosure.
Figure 10:
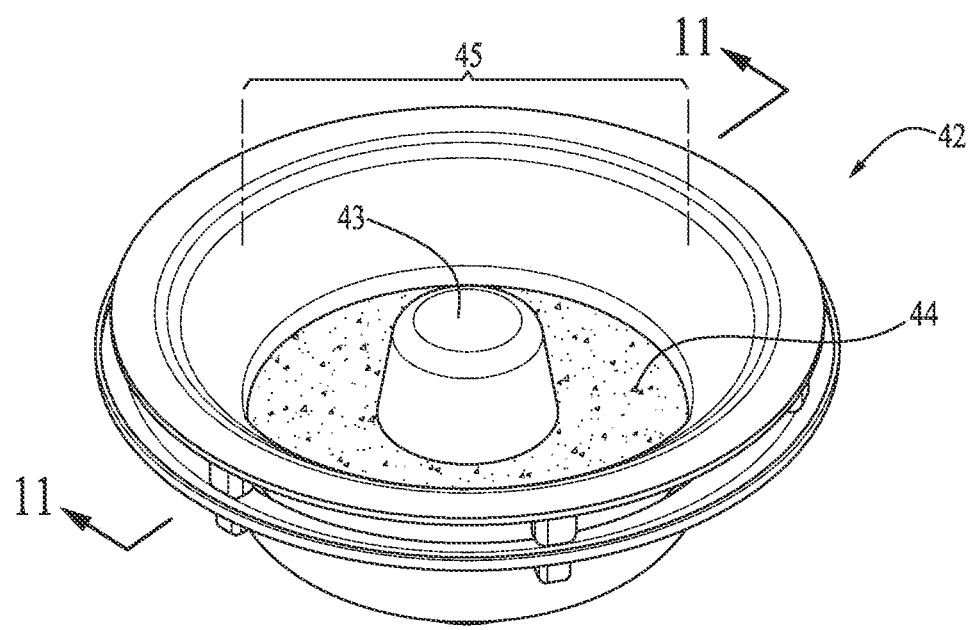
FIG. 10 is a top perspective view of a fourth article embodiment for disposing of FOG, in accordance with various aspects of this disclosure.
Figure 11:
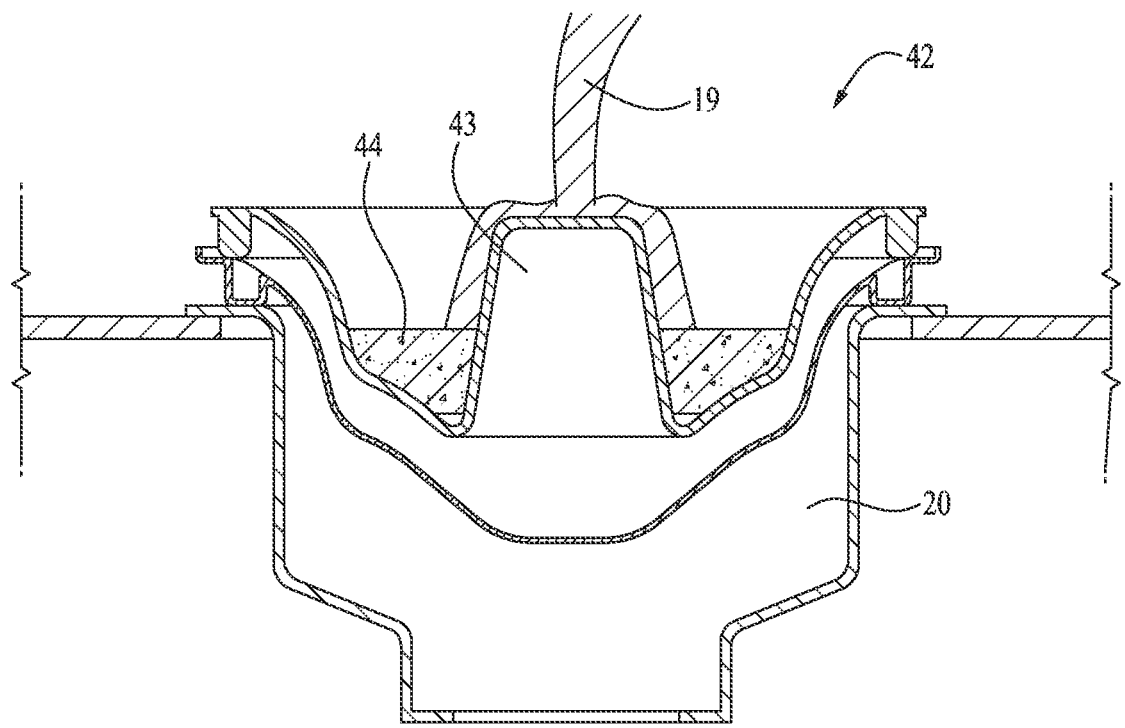
FIG. 11 is a cutaway cross sectional view of the article of FIG. 10, placed in a kitchen sink drain, in accordance with various aspects of this disclosure.

FIG. 9 is a cutaway cross sectional view of the article of FIG. 8, placed in a kitchen sink drain, in accordance with various aspects of this disclosure. As shown in FIG. 9, the hollowed inward part of the drain 20 may have a middle section 51 and a bottom section 52, and the outer membrane 38 may also have a middle section 53 and a bottom section 54 roughly conforming to the middle section 51 and bottom section 52. As shown in FIG. 9, in some examples, the cross section of the middle section 53 may be greater than the cross section of the bottom section 54, the height of the middle section 53 may be greater than the height of the bottom section 54, and/or the slope of the middle section 53 may be greater than the slope of the bottom section 54. FIG. 10 is a top perspective view of a fourth article embodiment for disposing of FOG, in accordance with various aspects of this disclosure. FIG. 11 is a cutaway cross sectional view of the article of FIG. 10, in accordance with various aspects of this disclosure. The configurations of absorbent material may vary in ways intended to maximize the amount of saturation given limited space. As shown in FIG. 10, a fourth article embodiment 42 may comprise a cone 43 design in the middle of and below the top opening 45 for distributing FOG 19 more evenly to a ring of absorbent material 44 surrounding the cone 43. Thus, as shown in FIG. 11, when the article 42 is placed over and in a drain 20, and when FOG 19 is poured through the top opening 45 and onto the cone 43, which may have a top height greater than the height of the absorbent material 44, the FOG 19 may be distributed to the absorbent material 44 surrounding the cone 43. The cone 43 and other designs may be for distributing FOG evenly to the absorbent material 44.

Figure 12:
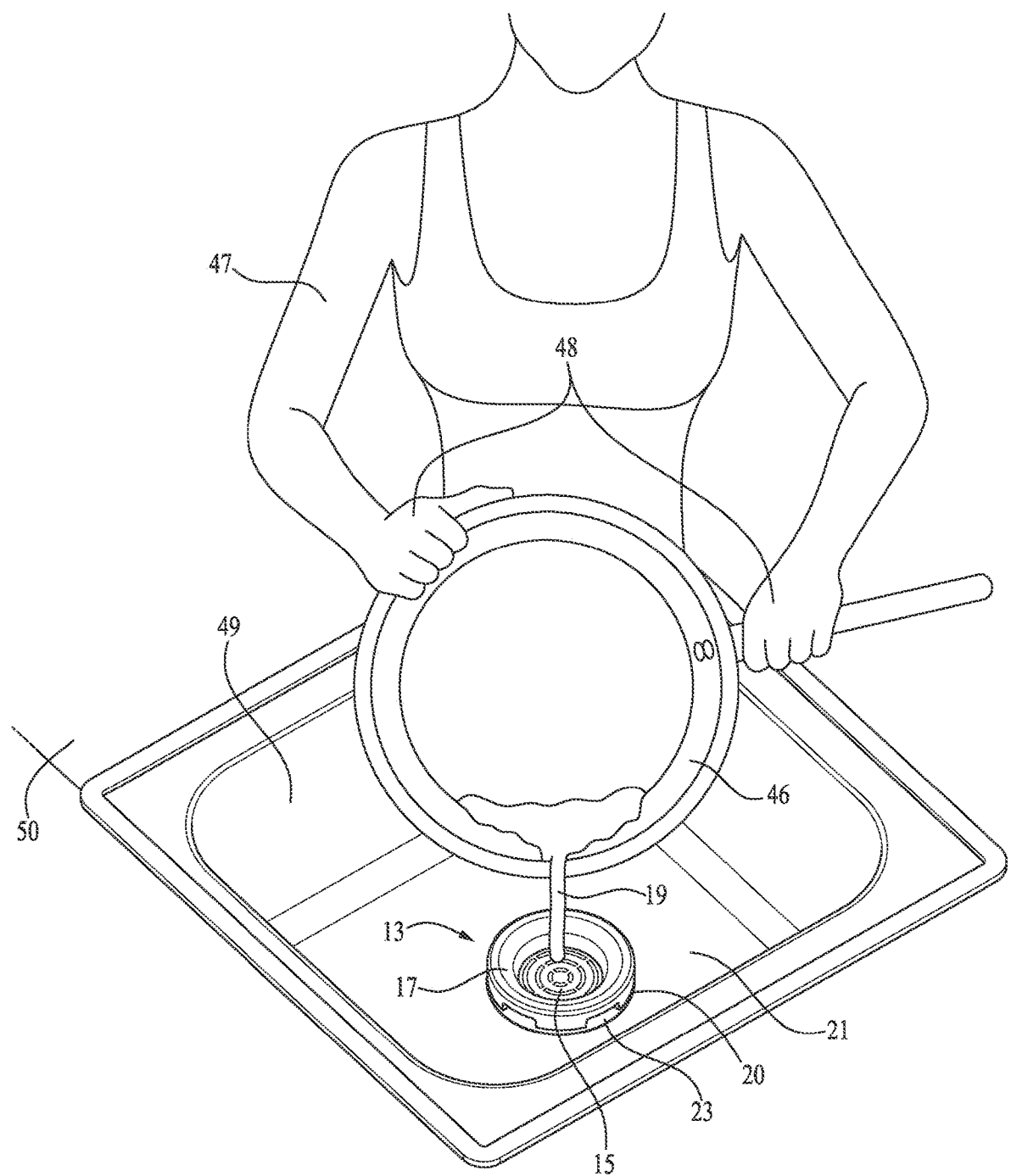
FIG. 12 is an overhead perspective view showing the article in FIG. 1 in its environment of use, stably positioned in a kitchen sink and receiving FOG poured therein, in accordance with various aspects of this disclosure.

FIG. 12 is an overhead perspective view showing the article in FIG. 1 in its environment of use, stably positioned in a kitchen sink and receiving FOG poured therein, in accordance with various aspects of this disclosure. Some embodiments, such as those mentioned and described above (e.g., embodiments 13, 27, 37, 42) in their environment of use may be stably positioned to receive FOG 19 therein in a drain 20 in the bottom of a kitchen sink surface 21, which may be advantageous in several respects, encouraging proper disposal instead of pouring FOG 19 down a drain 20. For example, (as shown in FIG. 12) the perimeter rim 17 may rest on the top of the drain 23 in a manner that is not substantially elevated above the bottom sink surface 21. This position may allow, when disposing of FOG 19 by pouring into the top opening 15 of the article 13, a cooking instrument 46 from which FOG is being poured to be held by a person 47 at a lower and more controlled elevation, and potentially not far above the sink bottom surface 21.

Moreover the rigidity of the body 16 (FIG. 1-3) and its shape configured to fit within the drain 20 and its inability to significantly move laterally may provide added stability lending to greater control while pouring FOG 19. In addition, said stability, which can be achieved without a hand 48 having to hold the article 13, may also leave both of a person's 47 hands 48 free to carefully pour the FOG 19 into the article 13. Furthermore, with the article 13 and the cooking instrument 46 both held at a lower elevation, the person 47 pouring may have a more preferable vantage point of looking down at the article 13 in the drain 20, and of standing in closer lateral proximity to the article 13. Also, pouring occurring substantially in the confines of the sink 49 at a level below the countertop 50 may also decrease the likelihood that the hot liquid FOG 19 will erratically jump from the cooking instrument 46 upward and out of sink 49 (which might otherwise damage or and/or dirty surrounding persons 47 and objects).

FIG. 13A is an overhead perspective view of another article embodiment 1300 for disposing FOG, in accordance with various aspects of this disclosure. The article 1300 may include a top portion 1305 having a top opening 1310. The article 1300 may also include a body portion 1315 connected to and located below the top portion 1305. In some examples, the body portion 1315 may include a continuous FOG-impermeable membrane 1320. In some examples, the FOG-impermeable membrane 1320 may be located on the exterior of the body portion 1315. In other examples, the FOG-impermeable membrane 1320 may be located on the interior of the body portion 1315.

In some examples, the body portion 1315 may have an upper body portion 1325 and a lower body portion 1330. The lower body portion 1330 and/or the upper body portion 1325, and/or portions thereof, may have a concave shape.

The body portion 1315 may also have a body middle surface 1335 dividing the upper and lower body portions 1325, 1330. In some examples, the body middle surface 1335 may have different features than the upper body portion 1325 and/or the lower body portion 1330. For instance, in some examples the body middle surface 1335 (and/or portion of the membrane 1320 thereof) may have a different slope or pitch than the upper body portion 1325 and/or the lower body portion 1330 (and/or portion of the membrane 1320 thereof). For example, the body middle surface 1335 or at least some portion thereof in one variation may be flat—e.g., substantially horizontal or perpendicular to a vertical axis 1340 defined by a line running from the center of the top opening 1310 to a center of a bottom surface 1345 of the lower body portion 1330.

Although illustrated in FIG. 13A as a circular outward jutting edge extending horizontally all the way around the body portion 1315, it may be appreciated that other variations of the body middle surface 1335 are also contemplated. For instance, in some examples the body middle surface 1335 may include at least one edge, which at least one edge may not extend continuously all the way around the body portion 1315. In some examples, the at least one edge may include two edges, located for examples directly opposite only another, and aligned along the same horizontal axis 1350 perpendicular to the vertical axis 1340. In some examples, the at least one edge may include three or more edges, evenly spaced yet aligned substantially along the horizontal axis 1350 perpendicular to the vertical axis 1340. In some examples, the at least one edge may have a length (e.g., a distance of the at least one edge running around part of the circumference or exterior of the body portion 1325 along the horizontal axis 1350 at the body middle surface 1335) and a width (e.g., a distance from a coordinate of the lower body portion 1330 contiguous to the body middle surface 1335 to a coordinate of the upper body portion 1325 along the horizontal axis), and other coordinates for defining the dimensions and/or features of the at least one edge.

FIG. 13B is a side perspective view of the article embodiment of FIG. 13A, in accordance with various aspects of this disclosure. The upper body portion 1325 may have a first maximum width 1355, and the lower body portion 1330 may have a second maximum width 1360. In some examples, the first maximum width 1355 may be greater than the second maximum width 1360.

The upper body portion 1325 may have a first maximum width 1355 near or contiguous to the top portion 1305 and a bottom maximum width 1365 contiguous to the body middle surface 1335. The top maximum width 1355 may be greater than the bottom maximum width 1365. In some examples the top maximum width 1355 may be less than five inches. In some examples, the top maximum width 1355 may be greater than five inches. In some examples, the bottom maximum width 1365 may be greater than two inches. In some examples, the bottom maximum width 1365 may be less than two inches. The lower body portion 1330 may have an upper maximum width 1360 (which in some examples may be the second maximum width 1360) contiguous to the body middle surface 1335 and a lower maximum width 1370, which in some examples may define a bottom surface 1345 of the body portion 1315, wherein the upper maximum width 1360 may be greater than the lower maximum width 1370. In some examples, the upper maximum 1360 width wall less than 1.9 inches. In some examples, the upper maximum 1360 width may be greater than 1.9 inches. In some examples, the lower maximum width 1370 that may define a bottom surface 1345 may be greater than 1.3 inches. In some examples, the lower maximum width 1370 defining a bottom surface 1345 may be less than 1.3 inches. The body middle surface 1335, or a portion thereof, may be flat or have a flat portion 1385 (which may in some examples be aligned with the horizontal axis 1350 shown in FIG. 13A). Some variations of the at article 1300 may have substantially different (e.g., larger) dimensions.

The body portion 1315 may have an interior 1375. The interior 1375 may include FOG absorbent material 1380. The top portion 1305 may also have legs or nubs 1390.

FIG. 13C is a top view of the article embodiment of FIG. 13A, in accordance with various aspects of this disclosure. The top portion 1305 may include a top opening 1310, which may be defined by a perimeter rim 1395. In some examples, and as mentioned above, the top position may further include a filter portion 1398 for filtering FOG from the top opening 1310 into the body portion 1315 (as shown in FIG. 13A). In addition, the top portion 1305 may include a removable lid 1397, which may or may not be transparent as shown, and which may also in some examples be provided as a piece separate from the top portion 1305. In some examples, the removable lid 1397 may be slightly larger/wider than the top portion 1305 to fit over and cover the top portion 1305 and seal the article 1300 or container by various manners known to the person or ordinary skill in the art.

FIG. 14A is a side view showing the article embodiment of FIG. 13A in an environment of use, in accordance with various aspects of this disclosure. The article 1300-A may be configured for placement on at least a portion of a first bottom surface 1405 of a sink surrounding a first drain 1410. In some examples, the body middle surface 1335-A may be configured for placement on at least a portion of a first bottom surface 1405 of a sink surrounding a first drain 1410. In some examples, the body middle surface 1335-A may include features for stable placement of the article 1300-A on at least a portion of a first bottom surface 1405 of a sink surrounding a first drain 1410. In some examples, at least some portion of the body middle surface 1335-A may be substantially flat, or have substantially the same pitch as the first bottom surface 1405. In some examples, the body middle surface 1335-A may be configured to maximize an area of the body middle surface 1335-A that may rest on the first bottom surface 1405, for greater stability. In some examples, the body middle surface 1335-A may include legs or nubs (not shown) similar to legs nubs 1390.

The lower body portion 1330-A of the article 1300-A may be sized to fit within the first drain 1410 while the article 1300-A is placed (e.g., while at least one edge of the body middle surface 1335-A is placed or positioned) on at least a portion of the first bottom surface 1405. The first drain 1410 may have a first drain maximum width 1415 that is greater than the second maximum width 1360-A of the lower body portion 1330-A. In some examples, the body middle surface 1335-A may have a middle surface maximum width 1430 greater than the first drain maximum width 1415. The first drain 1410 may also have a depth 1420 greater than a height 1425 of the lower body portion 1330-A. In some examples, the height 1425 of the lower body portion 1330-A may be greater than 1.4 inches. In some examples, the height 1425 of the lower body portion 1330-A may be less than 1.4 inches, such as in the range of about 1 to about 4 inches, or any value that may for example be less than a depth of a drain in which the lower body portion 1330-A is placed.

FIG. 14B is a side view showing the article embodiment 1300-B of FIG. 13A in another environment of use, in accordance with various aspects of this disclosure. In some examples, the top portion 1305-A may include the top opening 1310-A, and may include the perimeter rim 1395-A. In addition, in some examples, the top opening 1310-A may be defined by the perimeter rim 1395-A. The perimeter rim 1395-A may be configured for placement on at least a portion of a second bottom surface 1430 of a second sink surrounding a second drain 1435 having a second drain maximum width 1440. In some examples, the top portion 1305-A (and in some examples, the perimeter rim 1395-A thereof) may include legs or nubs 1390-A for stable placement on at least a portion of the second bottom surface 1430. In some examples, the upper body portion 1325-A may be concave shaped and sized to fit within the second drain 1435. The second drain 1435 may also have a depth 1450 greater than a height 1455 of the upper body portion 1325-A plus the height 1425-A of the lower body portion 1330-B.

In some examples, the height 1455 of the upper body portion 1325-A may be greater than 2.3 inches. In some examples, the height 1455 of the upper body portion 1325-A may be less than 2.3 inches. In some examples, the combined height of 1455 of the upper body portion 1325-A and the height 1425-A of the lower body portion 1330-B may be greater than 3.7 inches. In some examples, the combined height of 1455 of the upper body portion 1325-A and the height 1425-A of the lower body portion 1330-B may be less than 3.7 inches, or for example in a range of about 3 to 5 inches, or in some examples a value less than a depth of a drain in which the upper body portion 1325-A is placed (e.g., a depth 1450 of the second drain 1435 referenced below).

In some examples, the perimeter rim 1395-A may have a perimeter rim maximum width 1445 greater than the second drain maximum width 1440. In some examples the perimeter rim maximum width 1445 may be greater than five inches. In some examples the perimeter rim maximum width 1445 may be less than five inches. In some examples, the second drain maximum width 1440 may be greater than the first drain maximum width 1415. In some examples, the first maximum width 1360-B of the upper body portion 1325-A may be less than the second drain maximum width 1440 of a second drain. In some examples, the second drain maximum width 1440 may be sized to receive the upper body portion 1325-A of the article 1300-B. Some variations of the articles 1300-A and 1300-B may have substantially different (e.g., larger or smaller) dimensions, for use with drains of corresponding (e.g., much larger or smaller) dimensions.

Figure 15:
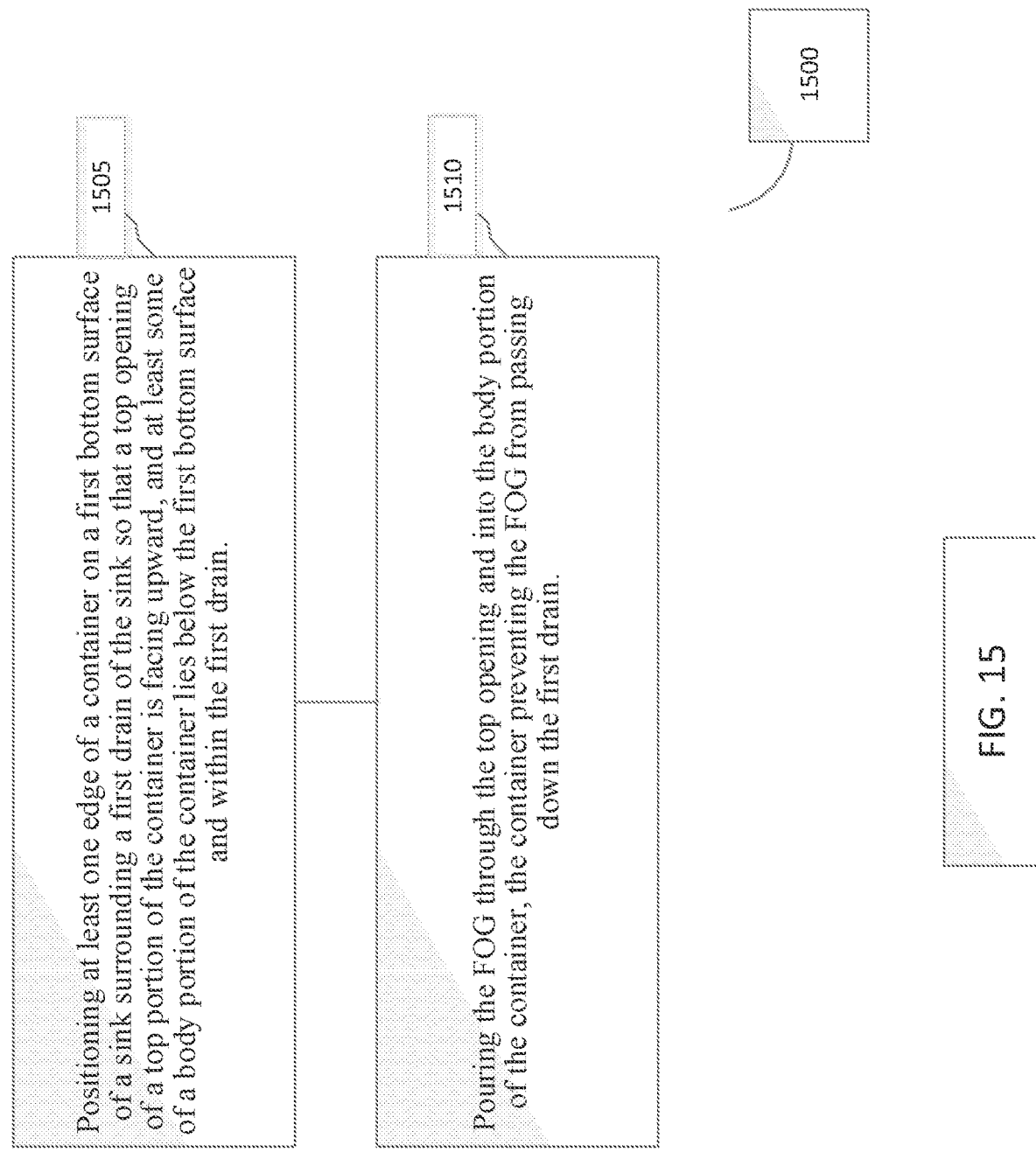
FIG. 15 is a flowchart illustrating an example of a method for disposing FOG, in accordance with various aspects of this disclosure.

FIG. 15 is a flowchart illustrating an example of a method 1500 for disposing FOG, in accordance with various aspects of this disclosure. At block 1505, the method may include positioning at least one edge of a container on a first bottom surface of a sink surrounding a first drain of the sink so that a top opening of a top portion of the container is facing upward, and at least some of a body portion of the container lies below the first bottom surface and within the first drain. In some examples, the body portion may have a FOG-impermeable membrane. At box 1510, the method may also include pouring the FOG through the top opening and into the body portion of the container, the container preventing the FOG from passing down the first drain.

FIG. 16 is a flowchart illustrating another example of a method for disposing FOG, in accordance with various aspects of this disclosure. At block 1605, the method may include positioning at least one edge of a container on a first bottom surface of a sink surrounding a first drain of the sink so that a top opening of a top portion of the container is facing upward, and at least some of a body portion of the container lies below the first bottom surface and within the first drain. In some examples, the body portion may have a FOG-impermeable membrane, in some examples of the method, the positioning may include resting at least two edges of the container on the first bottom surface. In some examples, the at least two edges may be located on different sides of the container. In some examples, the at least two edges may be located on opposite sides of the container.

At box 1610, the method may also include pouring the FOG through the top opening and into the body portion of the container, the container preventing the FOG from passing down the first drain.

In some examples, the body portion may have a concave shape. At box 1615, the positioning may include positioning the at least one edge of the container on the first bottom surface so that at least some of the concaved shaped body portion lies within the first drain.

In some examples, the at least one edge may include a first perimeter rim. Thus, at box 1620, the positioning may include resting the first perimeter rim of the container on the first bottom surface. In some examples as mentioned above, the first perimeter rim may divide an upper body portion and a lower body portion. In some examples, the body portion may have a first maximum width, and the first drain may have a second maximum width greater than the first maximum width.

At box 1625, the method may further include removing the container from the first bottom surface, and subsequently resting a second perimeter rim on a second bottom surface of a sink surrounding a second drain. In some examples the second drain may have a fifth maximum width greater than the second maximum width. In some examples, the second perimeter rim may be rested on the second bottom surface without the container having been first perimeter rim having been rested previously on the first bottom surface. In some examples, the second perimeter rim may be rested on the second bottom surface and subsequently container may be removal from that surface and then subsequently the first perimeter rim may be rested on the first bottom surface.

In some examples, the interior of the body portion may include absorbent material. At box 1630, the method may further include absorbing at least some of the FOG poured into the body portion using the absorbent material. The absorbing may occur either while the container resting on the first bottom surface, or while resting on the second bottom surface. In addition, the absorbent material may be removed from the container. Or alternatively, where the entire container is intended to be disposable, the absorbent material may be disposed of along with the entire container.

The foregoing description provides examples and is not limiting of the scope, applicability, and/or examples set forth in the claims. It may be appreciated that other variations such as would be apparent to the person of ordinary skill in the art are also contemplated. Changes may be made in the function and/or arrangement of features discussed Without departing from the scope of the disclosure. Various examples may omit, substitute, and/or add various features as appropriate.

The invention claimed is:

1. A container for disposing of fat, oil, and/or grease (FOG) comprising:
   an integrally formed continuous outer shell comprising an at least partially hollow interior, a top part having a top opening, a liquid impermeable bottom part, a liquid impermeable upper part connecting and contiguous to both the top part and the bottom part, a middle part dividing the top and bottom parts and comprising at least one middle edge for placement of the container on a first surface surrounding a first drain, the first drain having a first maximum width, the bottom part having a shape conforming at least in part to a hollow inner part of the drain for placement at least partially inside the first drain;
   wherein the other shell is configured to receive FOG through the top opening without the FOG exiting through the bottom part or the upper part; and
   wherein the bottom part comprises a second maximum width less than the first maximum width of the first drain.

2. The container of claim 1, wherein the at least one middle edge comprises a flat surface for placement of the container on the first surface surrounding the first drain, the flat surface having a third maximum width greater than the first maximum width.

3. The container of claim 2, wherein the top part comprises at least one top edge for placement on a second surface surrounding a second drain having a fourth maximum width.

4. The container of claim 3, wherein the at least one middle edge comprises a rim having a fifth maximum width greater than the fourth maximum width.

5. The container of claim 3, wherein the fourth maximum width is greater than the first maximum width, and the upper part has a sixth maximum width less than the fourth maximum width and greater than the second maximum width.

6. The container of claim 1, wherein the at least one middle edge comprises at least two edges.

* * * * *